(12) United States Patent
Donadille et al.

(10) Patent No.: US 7,756,641 B2
(45) Date of Patent: Jul. 13, 2010

(54) COMPUTATION OF SENSITIVITY FOR RESISTIVITY MEASUREMENTS

(75) Inventors: Jean-Marc Donadille, Al-Khobar (SA); Martin G Luling, Paris (FR); Gerald N Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 461 days.

(21) Appl. No.: 11/792,762

(22) PCT Filed: Dec. 20, 2004

(86) PCT No.: PCT/IB2004/004223

§ 371 (c)(1),
(2), (4) Date: Jun. 8, 2007

(87) PCT Pub. No.: WO2006/067539

PCT Pub. Date: Jun. 29, 2006

(65) Prior Publication Data
US 2008/0097732 A1    Apr. 24, 2008

(51) Int. Cl.
*G06F 19/00* (2006.01)
(52) U.S. Cl. ......................................... 702/6
(58) Field of Classification Search ................ 702/6, 702/7, 14
See application file for complete search history.

(56) References Cited

U.S. PATENT DOCUMENTS

| | | | |
|---|---|---|---|
| 5,867,806 A | 2/1999 | Strickland et al. | |
| 5,963,036 A | 10/1999 | Wu et al. | |
| 6,671,623 B1 | 12/2003 | Li | |
| 2002/0040274 A1 | 4/2002 | Yin | |

OTHER PUBLICATIONS

S. Gianzero, Yin-Yin Lin and Shey-Min Su, "A new high speed hybrid technique for simulation and inversion of resistivity logs", SPE 14189, Mar. 1988, p. 55-61.
Qing-Huo Liu, "Nonlinear inversion of electrode-type resistivity measurements", IEEE Transactions on Geoscience and Remote Sensing, p. 499-507, vol. 32, No. 3, May 1994.
A.G. Mezzatesta, M.H. Eckard, K.M. Strack, "Integrated 2D Interpretation of Resistivity Logging Measurements by Inversion Methods", Paper-E, SPWLA 36th Annual Logging Symposium, Jun. 26-29, 1995.
Michael J. Tompkins, David L. Alumbaugh, Darrell T. Stanley, and Xinyou Lu, "Numerical analysis of near-borehole and anisotropic layer effects on the response of multicomponent induction logging tools", Geophysics, Jan. 2004, vol. 69, No. 1, p. 140-151.
Xinyou Lu, and David L. Alumbaugh, "Three-Dimensional Sensitivity Analysis of Induction Logging in Anisotropic Media", Petrophysics, Nov. 2001, vol. 42, No. 6, p. 566-579.
P. Terpolilli, J. Ventre, F. Touron, I. Ramos, "A Method for Computing Fast and Accurate Analytical Gradient: the Key for Routinely Performing Efficient 2D and 3D Resistivity Inversions", SPE 77713, 2002.
International Search Report for. PCT/IB2004/004223 Mailed Dec. 30, 2005.

*Primary Examiner*—Edward Raymond
(74) *Attorney, Agent, or Firm*—Hoffman Warnick LLC

(57) ABSTRACT

The present invention provides methods and systems for numerically computing tool response sensitivities of subterranean measurement tools such as resistivity logging tools. The methods and systems enable much faster computation of sensitivities than previously available for resistivity tools. For typical tools that apply dozens or hundreds of parameters, the methods of the present invention may reduce sensitivities computation time by a factor substantially equal to the number of parameters.

8 Claims, 11 Drawing Sheets

FIG.6(Con't)
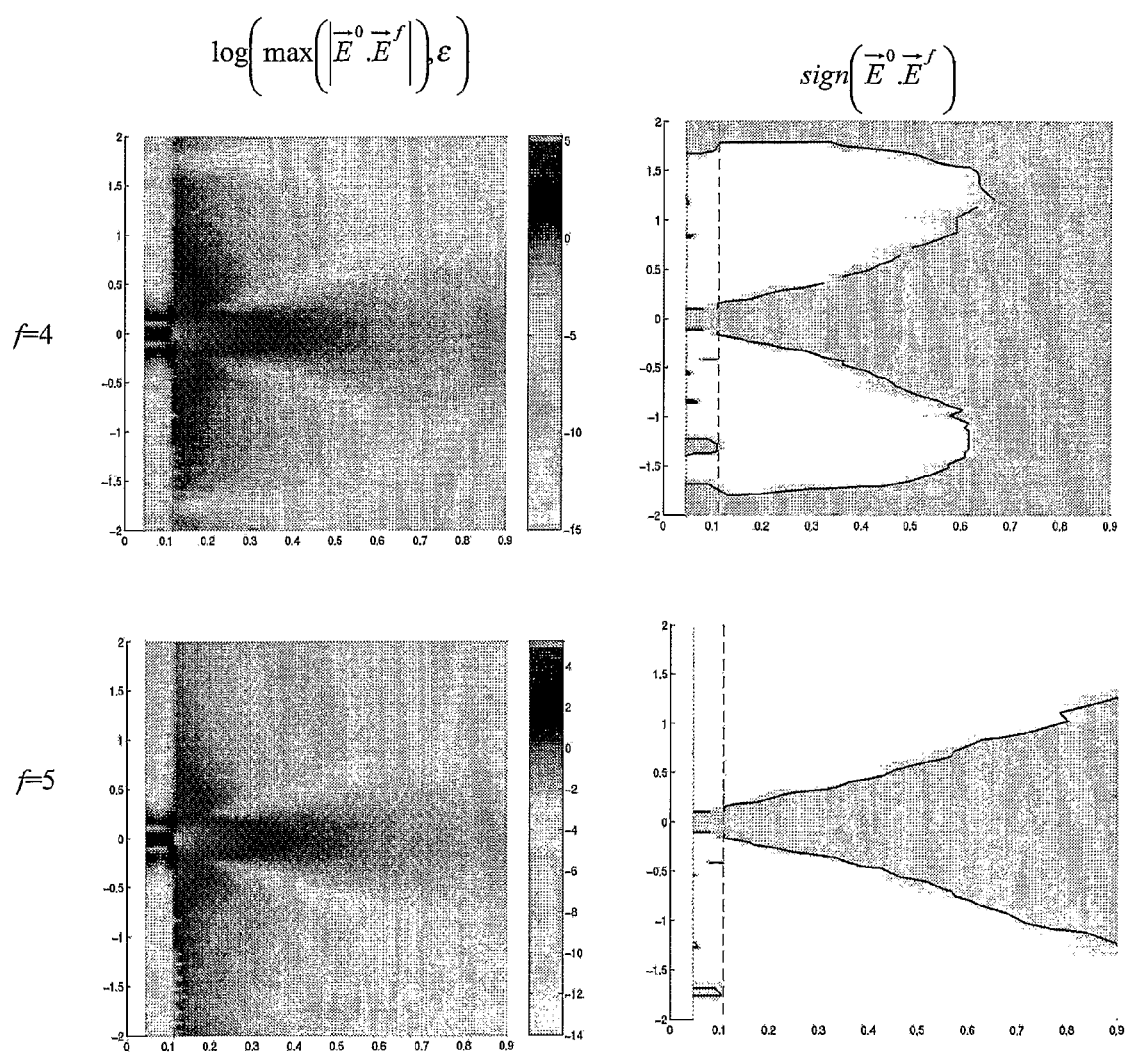

COMPUTATION OF SENSITIVITY FOR RESISTIVITY MEASUREMENTS

FIELD OF THE INVENTION

The present invention relates generally to methods and systems for investigating subterranean formations. More particularly, this invention is directed to methods and systems for computing sensitivities of resistivity tools.

BACKGROUND OF THE INVENTION

The investigation of subterranean formations is a common occurrence in oil and gas exploration and production operations. Methods and tools for investigating subsurface formations have advanced considerably over the years. There are many commercially available acoustic, nuclear, electromagnetic, and resistivity tools that provide a variety of information about formations adjacent to a borehole.

Early electrical methods of exploration in the 1920s tested electrical resistivity and electrostatic potential, but proved to be more successful at locating metallic ores than oil and gas. Oil and gas have resistivity or conductivity properties that differ from water, which conducts electricity more readily. Occurrences of oil and gas can sometimes be located by this difference in conductivity. Conductivity measurements also indicate porosity and hydrocarbon saturation, which is a very important component of petrophysical resource assessment.

The usefulness of the conductivity measurements is dependent on the accuracy of the true formation conductivity ($C_t$). Apparent formation conductivity ($C_a$), as measured by a standard logging tool, however, is not equal to true formation conductivity ($C_t$) in most logging environments because of the limitations of tool physics and non-ideal borehole conditions. Deep-reading conductivity/resistivity tools cannot resolve formations less than a few feet thick, and cannot make accurate true-conductivity ($C_t$) measurements when the borehole diameter is variable or when drilling mud or other fluids with a different resistivity than the formation fluids has seeped into the formation (invasion), thereby altering the conductivity of the invaded zone ($C_{xo}$).

The traditional method of correcting the environmental effects on the accuracy of conductivity measurements has been the use of chartbooks provided by logging service companies. However, chartbooks only contain a limited number of charts with strict assumptions (e.g., borehole diameter, mud resistivity, and $C_t/C_{xo}$ ratio) that rarely match real world examples. Therefore, chartbook corrections may only serve to make a qualitative estimation. Furthermore, the nonlinear conductivity tool response (due to borehole diameter, mud conductivity, invasion, and bed thickness or shoulder bed effects all together) can not be corrected from the chartbooks' corrections without assumptions of linear superposition.

Computer inverse modeling of resistivity tool response can be conducted to convert apparent resistivity from logs into a response profile that may closely approximate reality. In fact, modern environmental correction charts provided by service companies are the result of computer forward modeling. In general, the inverse modeling involves replicating the observed field log by numerically solving the mathematical boundary value problems of the electrical or electromagnetic fields generated by a specific resistivity tool under a predefined layered-earth model. To the degree that the field log and the computed tool response are in acceptable agreement through iterative forward modeling, the underlying earth model may be considered as one possible representation of the formation's true resistivity or conductivity profile. Mathematically, such an inversion process attempts to fit the computed tool response under a set of earth parameters (e.g., bed thickness, $C_t$, $C_m$, $C_{xo}$, borehole diameter and invasion depth) to an actual field conductivity log, or a set of actual field logs. The parameters in the earth model can be refined by solving least-squares problems through the iterative process to minimize the sum of the squares of the errors between the computed tool response and the measured field log. The iteration may continue until the fit between the computed and field logs reaches predetermined criteria.

With the advent of modeling codes and the significant increase in computing power, resistivity tool response modeling has become a feasible option for formation evaluation. 2D inversion of resistivity logging tool measurements based on iterative 2D forward modeling with finite element or hybrid methods are described in Gianzero, S., Lin, Y., and Su, S., 1985, "A new high speed hybrid technique for simulation and inversion of resistivity logs", SPE 14189; Liu, Q., H., 1994, "Nonlinear inversion of electrode-type resistivity measurements", IEEE on Geoscience and Remote Sensing, Vol. 32, No. 3, pp 499-507; and Mezzatesta, A. G., Eckard, M. H., Strack, K. M., 1995, "Integrated 2D Interpretation of Resistivity Logging Measurements by Inversion Methods", Paper-E, SPWLA 36th Annual Logging Symposium Transactions.

However, the tool response or sensitivity calculation used to update an iterative inversion model takes time to compute. Traditional analytic computation of sensitivity is linear with respect to the number of parameters. The number of parameters used for an accurate resistivity log often reaches the hundreds, significantly slowing the computation time.

The present invention is directed to overcoming, or at least reducing the effects of, one or more of the problems outlined above.

SUMMARY OF THE INVENTION

The present invention meets the above-described needs and others. Specifically, the present invention provides methods and systems for numerically computing tool response sensitivities of subterranean measurement tools such as resistivity logging tools. The methods and systems facilitate much faster computation of sensitivities than previously available for resistivity tools. For typical tools that apply dozens or hundreds of parameters, the methods of the present invention may reduce sensitivities computation time by a factor substantially equal to the number of parameters. For example, the time it takes traditional resistivity logging tools to update a formation modeled by 200 parameters is reduced by a factor of approximately 200 using the methods and systems of the present invention. The methods and systems of the present invention are capable of computing tool response sensitivities simultaneous with running a formation simulation.

The methods and systems of the present invention may be applied to any measurement operation relating to subterranean resistivity measurements, including, but not limited to: induction and propagation wireline resistivity tool measurements, laterolog measurements, resistivity-while-drilling measurements, and permanent resistivity sensor measurements.

Application of the principles of the present invention provides a method comprising computing sensitivities of a subterranean formation resistivity measurement apparatus using numerical analysis. The numerical analysis used to compute the sensitivities of the resistivity measurement apparatus may include finite element analysis, finite difference analysis, or finite volume analysis. The subterranean formation resistivity measurement apparatus may be a galvanic-type tool. The computing sensitivities of the subterranean formation resistivity measurement apparatus using numerical analysis may comprise computing sensitivities to inversion parameters of a laterolog. The computing sensitivities may include computing electrical potential differences expressed with a Green function. The methods may include computing sensitivities of the resistivity tool at each iteration of an inversion loop with respect to a plurality of parameters. The methods and systems of the present invention may iteratively run an inversion simulation for formation resistivity simultaneous with the computing of sensitivities.

Another aspect of the invention provides a method of operating a resistivity tool in a subterranean formation, comprising calculating a tool response function on the fly for laterolog measurements. The calculation of a tool-response function may include evaluating the sensitivities of the resistivity tool with respect to a plurality of parameters defining the subterranean formation. The plurality of parameters may comprise at least one hundred parameters. The tool response function may be calculated on the fly by numerical methods. Therefore, the tool response function may be calculated without use of a look-up table.

Another aspect of the invention provides a method for 2D inversion of true resistivity from laterolog tool measurements, comprising: a) providing a subterranean formation resistivity laterolog measurement tool; b) running an inversion simulation based in an initial formation model with the subterranean formation resistivity tool; and c) computing sensitivities of the subterranean formation resistivity tool with numerical simulators. The method may further include: d) updating the formation model; e) comparing the updated formation model field measurements; f) repeating steps (b)-(e) if the comparison falls outside of predetermined mismatch criteria; g) outputting a final formation model if the comparison yields a result within the predetermined mismatch criteria.

Another aspect of the invention provides a method of generating a well bore resistivity log, comprising simultaneously computing an inversion loop iteration model and tool a response sensitivity calculation, where neither a transmitter nor a receiver is modeled as a point.

The present invention provides a system for taking measurements relating to a subterranean formation, comprising a resistivity measurement tool, a computer in communication with the resistivity measurement tool, and a set of instructions executable by the computer that, when executed, simultaneously iteratively computes an inversion loop model of the formation and a tool response sensitivity calculation. Neither a transmitter nor a receiver is modeled as a point in the inversion loop model according to some embodiments.

The present invention also contemplates a computer readable storage device encoding a program of instructions including instructions for computing tool response sensitivities of a subterranean formation resistivity measurement tool using numerical analysis. The program may also include instructions for simultaneously computing the tool response sensitivities with an inversion loop formation resistivity model.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

The accompanying drawings illustrate preferred embodiments of the present invention and are a part of the specification. Together with the following description, the drawings demonstrate and explain the principles of the present invention.

Throughout the drawings, identical reference symbols designate similar, but not necessarily identical, elements.

DETAILED DESCRIPTION OF THE PREFERRED EMBODIMENTS

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates numerical computation of response sensitivities of subterranean measurement apparatus such as resistivity logging tools. The methods and systems facilitate much faster computation of sensitivities than previously available for resistivity systems that employ look up tables to find sensitivities. For typical tools that apply dozens or hundreds of parameters, the methods of the present invention may reduce sensitivities computation time by a factor substantially equal to the number of parameters. For example, the time it takes traditional resistivity logging tools to update a formation modeled by 200 parameters is reduced by a factor of approximately 200 using the methods and systems of the present invention. The methods and systems of the present invention are capable of computing tool response sensitivities simultaneous with running a formation simulation.

The methods and systems of the present invention may be applied to any measurement operation relating to subterranean resistivity measurements, including, but not limited to: induction and propagation mobile resistivity tool measurements, laterolog measurements, resistivity-while-drilling measurements, and permanent resistivity sensor measurements. The methods and systems described below may be particularly well-suited for use in conjunction with 2D inversion of laterolog tool measurements, but the principles described herein are not so limited. The discussion and figures below include a discussion of resistivity tool types, followed by a description of 2D inversion, the reasons for computing sensitivities, and methods of computing sensitivities according to principles of the invention.

As used throughout the specification and claims, the term "logging" means to record a measurement versus depth or time, or both, of one or more physical quantities in or around a well and includes, but is not limited to: resistivity logging, logging while drilling (LWD), measurement while drilling (MWD), permanent monitoring, and semi permanent monitoring. "On the fly" refers to a new calculation that is done during an operation, as opposed to referring to a look-up chart or table. The words "including" and "having," as used in the specification, including the claims, have the same meaning as the word "comprising."

Figure 1:
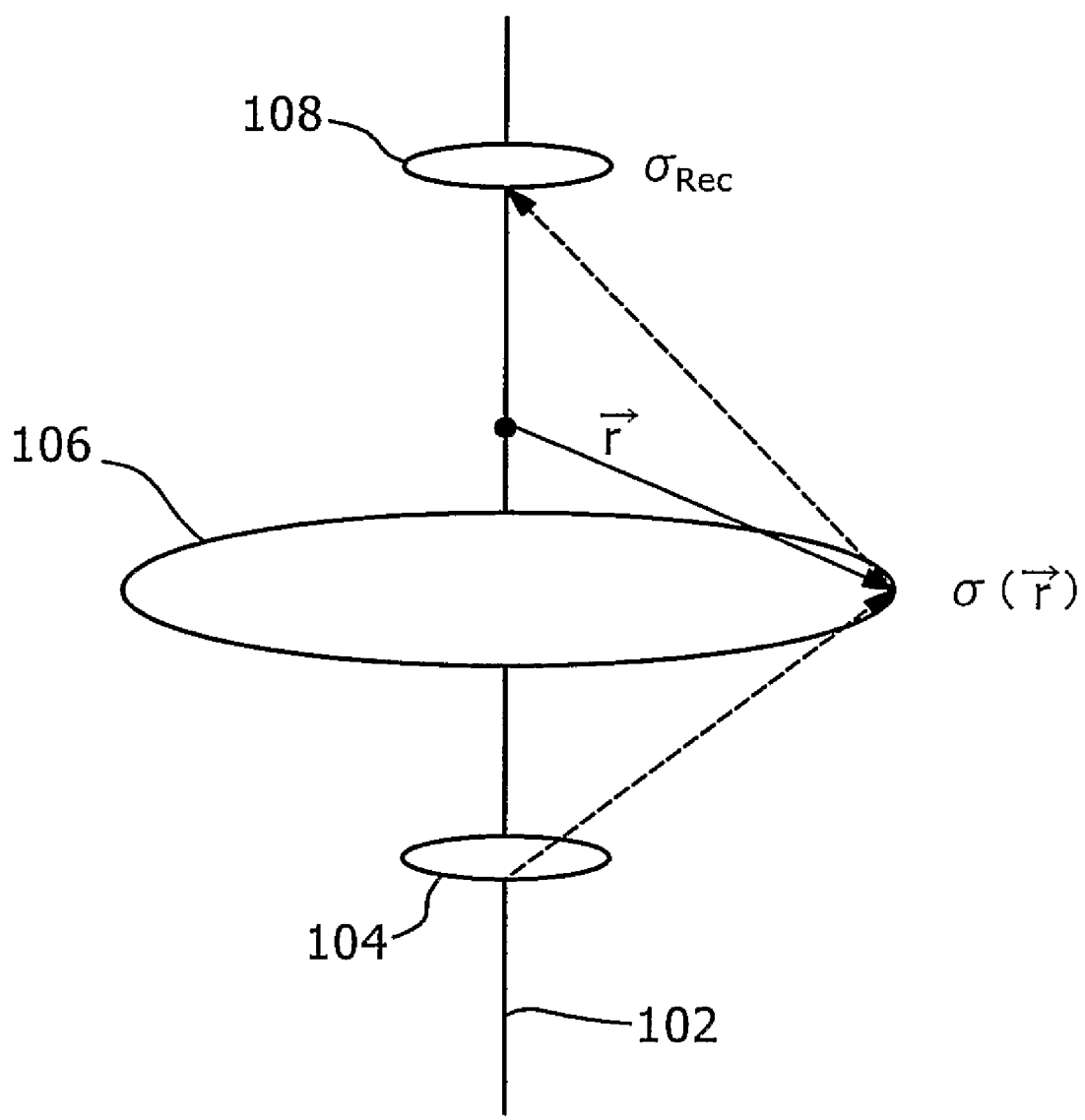
FIG. 1 schematically illustrates a two-coil induction resistivity tool.

Subterranean resistivity tools are generally divided into two categories: induction (or propagation) tools and galvanic devices. FIG. 1 illustrates a simplified 2-coil induction or propagation device. Commercial induction tools include multiple coil arrays. However, the basic building block for commercial multiple coil arrays is still the "1 transmitter-1 receiver system" shown in FIG. 1.

A vertical line 102 represents a tool axis. A transmitter 104 (e.g. a coil driven by a sinusoidal current) generates a magnetic field that induces eddy current loops 106 in a surrounding formation (only one eddy current loop 106 is represented in FIG. 1). The intensity of the eddy current is proportional to the formation conductivity σ along the loop 106. The eddy currents 106 in turn generate a second magnetic field, which induces an alternating voltage in a receiver coil 108. A conductivity signal $\sigma_{Rec}$ is given by the contribution of all the induced current loops over a whole volume V:

$$\sigma_{Rec} = \iiint g(\vec{r})\sigma(\vec{r})dV$$

Here the function g (which also depends of the formation conductivity) defines the relative weight of a location in the formation to the received signal: as $$\frac{\delta \sigma_{Rec}}{\delta \sigma(\vec{r})} = g(\vec{r})$$

this is the sensitivity function that is needed for updating the formation model within an inversion scheme.

Historically in the design of induction tools, this function (usually called a "response function") has been better and better approximated analytically. For modeling the induction tool response, the transmitter 104 (at least the coil cross-section) is considered to be a point (infinitesimally small). This allows one to analytically derive the solution to the Maxwell equations with simple formation geometries. For 2-dimensional formation geometries, semi-analytic codes are typically used (analytic in one dimension, numeric in the other one).

Figure 2:
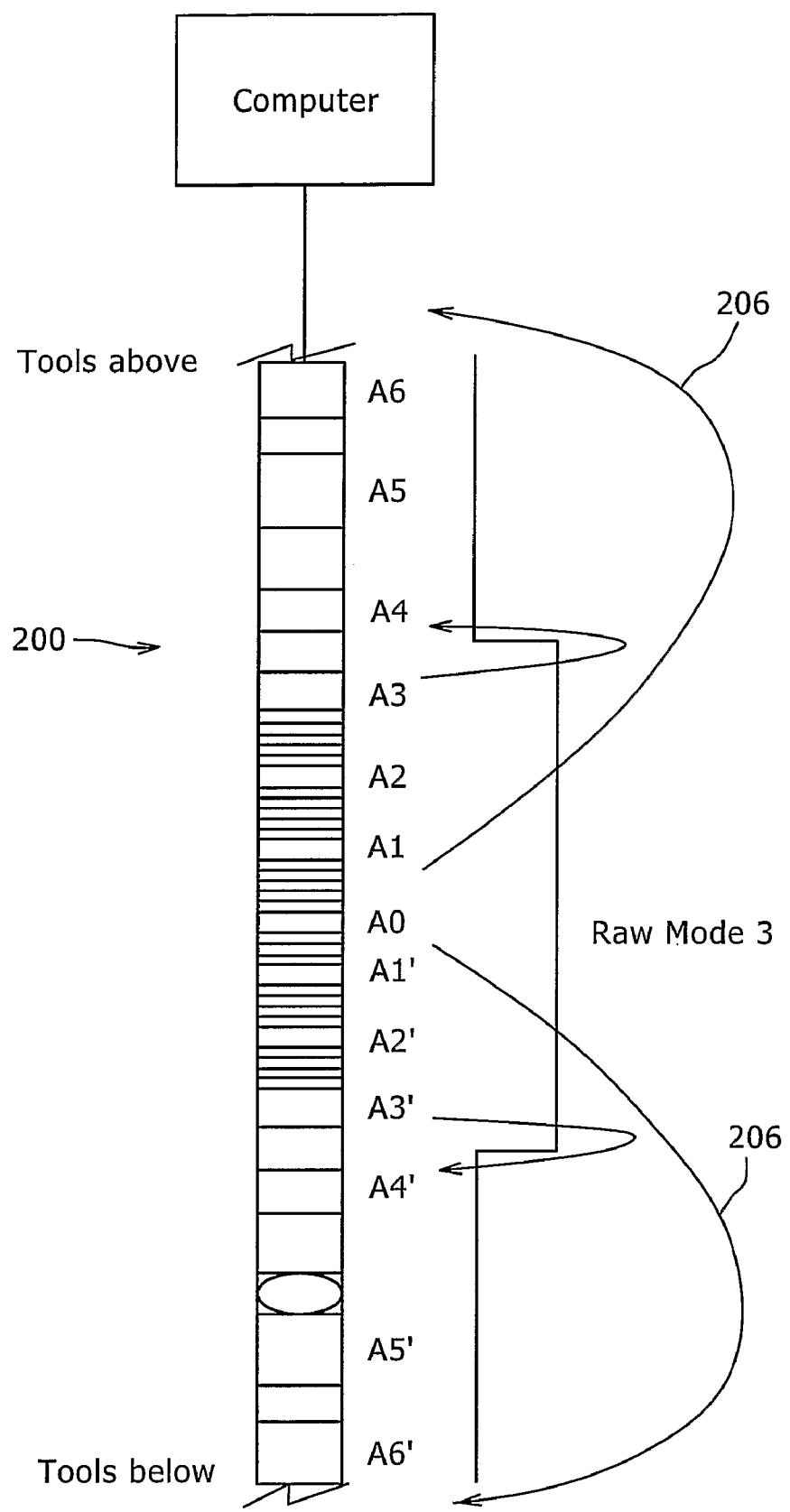
FIG. 2 is a subterranean resistivity measurement system operating in a third mode according to one embodiment of the present invention.

However, for laterolog-type or galvanic electrode type tools, the principle of calculating tool response sensitivities is totally different from induction tools. Referring to FIG. 2, for a galvanic tool 200, a central electrode A0 sends a current (considered as DC, although it is actually AC with low frequency) of intensity I. If the borehole fluid is conductive enough, part of this current enters the formation, and eventually comes back to return electrodes of the tool 200 via current lines 206. If the return electrodes are at the same potential as a reference electrode Vref then Ohm's law relates the potential drop to the current intensity and the resistance along the path of the current:

$$V_{A0} - V_{ref} = \rho I$$

By making use of a tool-dependent K-factor that relates resistance to resistivity, then the apparent resistivity measured by the tool is given by:

$$R_{app} = K \frac{V_{A0} - V_{ref}}{I}$$

Several apparent resistivities are measured by changing the path of the current lines into the formation (side electrodes are used to adequately "focus" the current into the formation in different ways). For this type of galvanic tool 200, because the source and receivers have a certain length (they can not be assimilated to "points"), Maxwell's equations can not be solved analytically. Instead, a solution may be computed by numerical techniques, such as finite volume, finite differences, or finite elements analysis.

Unlike for induction tools, response functions have never been numerically computed for laterologs. The advantages of numerical computation of response functions or the sensitivities of tool response are discussed below. The following paragraphs describe galvanic inversion methods.

Conventional 2D inversion techniques compute responses of apparent resistivity ($R_{app}$) when resistivity measurement apparatus such as laterolog tools are surrounded by a planar formation with substantially no dip, where dip describes the angle between the tool axis and the direction perpendicular to the layers. The axis of symmetry of the tool geometry facilitates choosing a 2D computational domain lying in a plane oriented in radial and vertical directions.

An input formation is entered as a sequence of beds, each bed being characterized by a bed model. A bed model specifies geometrical and physical properties of the bed, such as a length of invasion $l_i$, a bed upper boundary, and conductivity of a flushed and an uninvaded zone ($C_{xo}$ and $C_t$).

In order to compute the response of the tool at a given depth, the conductivity of each cell of a finite element mesh is assigned by domain averaging. In reality, the mesh is non-conformal, and the conductivity of a given element is computed by averaging the conductivity in the domain delimited by the element. Then, the following situations are simulated by means of the finite element methods: each of the active electrodes is successively excited (the current flowing out is set to 1 A), and the other ones are set as receptors. This electrostatic situation is described by the Laplace equation:

$$\vec{\nabla} \cdot \overleftrightarrow{\sigma} \cdot \vec{\nabla} \phi_i = 0 \qquad (1)$$

where:

$\phi_i$ is the electric potential when the i-th electrode is excited; and

σ is the conductivity tensor, possibly anisotropic.

The electric potential $\phi_f$ corresponding to the focusing mode f of the tool is then obtained by linear superposition. The equation (1) is solved with the following boundary conditions:

$$\vec{v} \cdot \vec{\nabla}\phi_i = 0 \text{ on } \partial\Omega_v \quad (2)$$

where $\partial\Omega_v$ represents either the edge of the insulators or a limit of the computational domain far away from the tool, where no current is entering or leaving ($\vec{v}$ is the outward normal to the domain);

$$\phi = 0 = 0 \text{ on } \partial\Omega_0 \quad (3)$$

where $\partial\Omega_0$ also is a domain boundary located far away from the tool, so the potential is assumed null;

$$\vec{v} \cdot \vec{\sigma} \cdot \vec{\nabla}\phi = \frac{V_k - \phi}{Zc_k} \text{ on } \partial\Omega_1 \quad (4)$$

where $\partial\Omega_1$ is the union of the edges of the tool electrodes. $V_k$ and $Zc_k$ are respectively the potential and the contact impedance of the k-th electrode. This Robin condition describes a chemical reaction occurring on the electrode outer surface.

Figure 3:
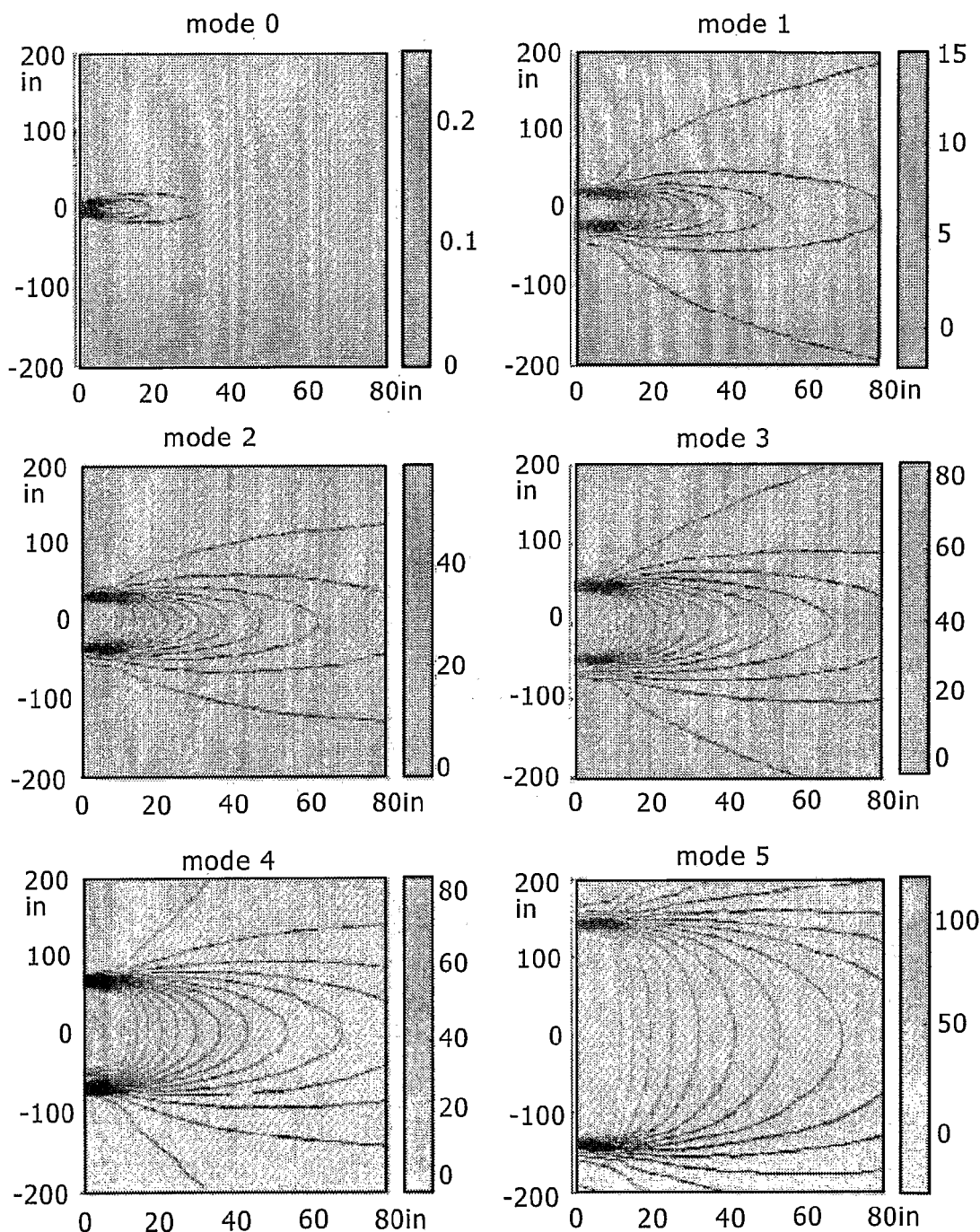
FIG. 3 illustrates electric potential for five modes of a resistivity measurement tool according to one aspect of the present invention.

After performing the linear superposition, the electric potential is retrieved for each focusing mode f: FIG. 3 illustrates a plot of the value of these potentials for five (1 to 5) modes of the resistivity tool 200, relatively close to the tool. The formation is homogeneous with $R_t = 10$ Ω.m. The borehole is described by rh=4.25 inches and $R_m = 0.1$ Ω.m.

Finally, for each focusing mode f, the apparent resistivities are computed with the relationship:

$$Rapp_f = K_f \frac{U_f}{I_{0f}} \quad (5)$$

where:
 $K_f$ is the geometrical factor of the tool;
 $U_f$ is the voltage of the central electrode A0. In practice, $U_f$ is computed as the average of the voltages of the two bucking electrodes surrounding A0: M0 and M0';
 $I_{0f}$ is the intensity of the current flowing out of A0;

The inversion algorithm is based on an iterative process. That is, the user determines a first guess of unknown formation parameters. The theoretical tool response is computed using a 2D inversion simulation (such as Simulog2D available from Schlumberger) and compared to the actual measurements. Subsequently, the parameters are updated until mismatch satisfies predetermined criteria. The iterative process is described illustratively in FIG. 4.

Figure 4:
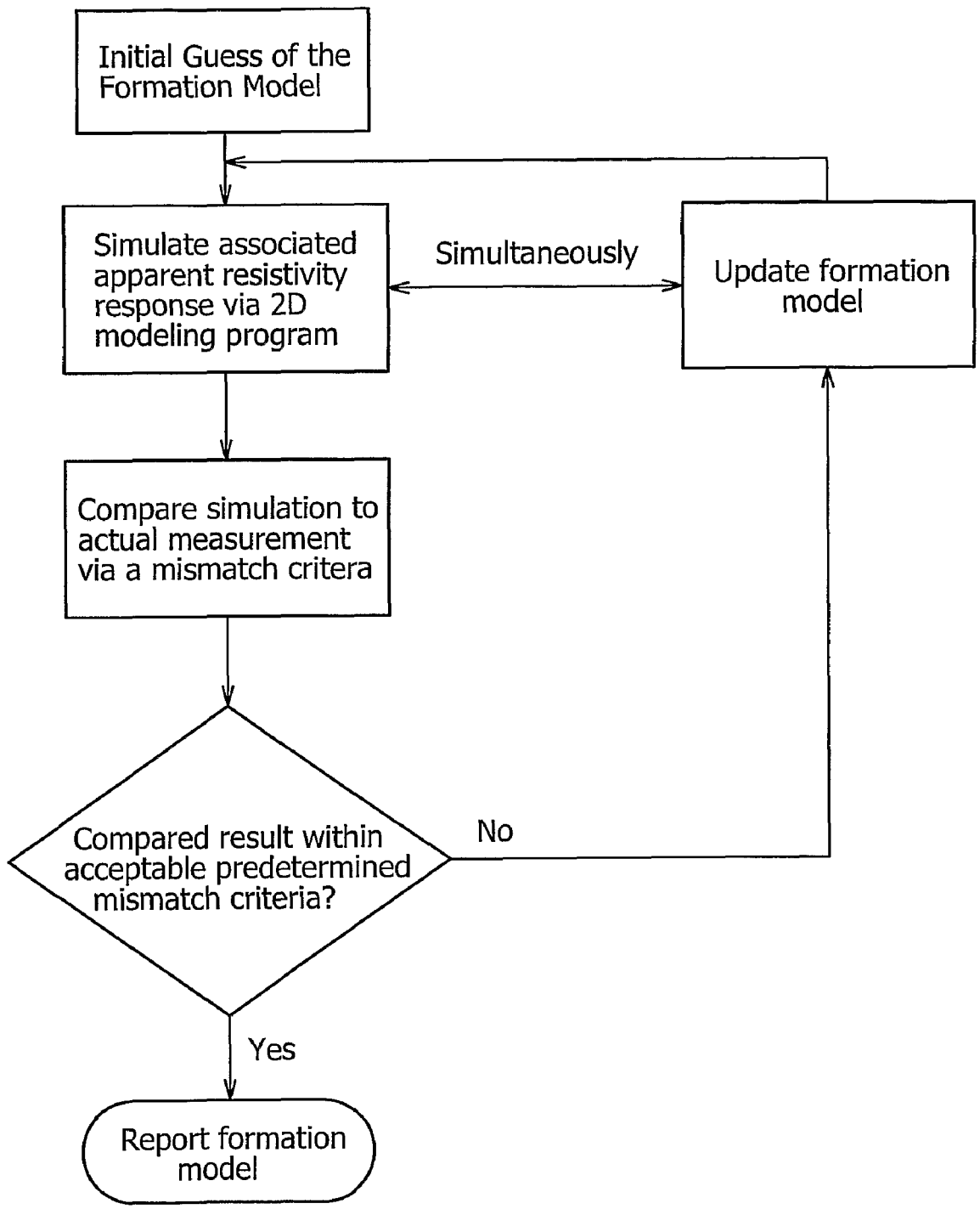
FIG. 4 is a flowchart illustrating the steps of a subterranean formation resistivity or conductivity inversion algorithm according to one aspect of the present invention.

As shown in FIG. 4, at each iteration of the inversion loop, the formation model is updated. The formation model update usually requires the values of the derivatives (or sensitivities) of the computed apparent resistivity response with respect to all of the formation parameters. The updating of the formation model typically takes 90-92% of the computing time of an iteration loop. However, according to principles of the present invention, the formation model is updated by calculating sensitivities at the same time the 2D simulation is taking place, thereby greatly reducing a majority of the time previously allocated to a 2D inversion simulation.

When performing the evaluation of the formation by the use of the apparent resistivity measurements, the user first selects a portion of a formation of interest. The portion of the formation of interest is formed of a sequence of beds. The geometrical and physical parameters of each of the beds must be determined. Depending of the bed model type and of the choice of the user to inverse or not for each parameter, the number $n_p$ of parameters per bed to be determined is variable. Often the number of parameters per bed is around 4 (e.g.: $l_i$, $C_{xo}$, $C_t$ and the upper bed boundary for each bed).

Wl (for Window Length) is designated as the length of the zone where the formation is evaluated (in ft), which is formed of a sequence of Nb beds. A reasonable example case is a 100 ft window comprising 50 beds. A tool sampling rate may be 6 in, and 2*Wl log stations lie in this window. If the apparent resistivity measurements at all depths are used, 2*Wl simulations should be taken into account.

By denoting $n_m$ as the number of apparent resistivity measurements used in the inversion (usually 5), it follows that the number of derivatives to be computed at each iteration of the minimization process is:

$$N_{der} = 2 * Wl * Nb * n_p * n_m$$

Prior to the principles of the invention described herein, the derivatives have been computed with a finite difference scheme $$\frac{\partial R_{app}i}{\partial p} = \frac{R_{app}i(p + \delta p) - R_{app}i(p)}{\delta p}$$

where $R_{app}i(p)$ denotes the computed i-th mode of the apparent resistivity for the set of parameters p. This computation necessitates $2*Wl*(Nb*n_p+1)$ calls to the forward model per iteration (using the notations defined above). In the reasonable case given as an example above, a software program for 2D simulation needs to be called 40,200 times. Obviously, this large number of calls is time-consuming, and one reason why a new way for computing the sensitivities is described below. Accordingly, a new numerical method for calculating sensitivities using a virtual reciprocal mode is explained below.

According to some aspects of the methods of the present invention, electric potential is expressed with a Green function. For any mode of a galvanic resistivity measurement tool, the electric potential obeys (or fulfills) the following Laplace equation in the 2D computational domain Ω:

$$\vec{\nabla} \cdot \overset{\leftrightarrow}{\sigma}(\vec{r}) \cdot \vec{\nabla}\phi(\vec{r}) = 0 \quad (1)$$

Equation (1) is used to define a scalar-valued Green function G(r,r';σ) that verifies on Ω:

$$\vec{\nabla} \cdot \overset{\leftrightarrow}{\sigma}(\vec{r}) \cdot \vec{\nabla} G(\vec{r}, \vec{r}'; \overset{\leftrightarrow}{\sigma}) = \delta^2(\vec{r}' - \vec{r}) \quad (6)$$

with the following boundary conditions (the same notations as presented above are used):

$$\vec{v} \cdot \vec{\nabla} G = 0 \text{ on } \partial\Omega_v \quad (7)$$

for the homogeneous Neumann condition;

$$G = 0 \text{ on } \partial\Omega_0 \quad (8)$$

for the homogeneous Dirichlet condition;

$$\vec{v}.\vec{\sigma}.\vec{\nabla}G = -\frac{G}{Zc_k} \text{ on } \partial\Omega_1 = \bigcup_k \Gamma_k \quad (9)$$

for the homogeneous Robin condition ($\Gamma_k$ is the edge of the k-th electrode)

Equations (1) and (6) are used in Green's second identity:

$$\int dV' G(\vec{r},\vec{r}';\vec{\sigma}) \vec{\nabla}'.\vec{\sigma}(\vec{r}').\vec{\nabla}'\phi(\vec{r}') - \quad (10)$$

$$\int dV' \phi(\vec{r}')\vec{\nabla}'.\vec{\sigma}(\vec{r}').\vec{\nabla}' G(\vec{r},\vec{r}';\vec{\sigma}) =$$

$$\oint dS' G(\vec{r},\vec{r}';\vec{\sigma})\vec{v}.\vec{\sigma}(\vec{r}').\vec{\nabla}'\phi(\vec{r}')$$

$$\oint dS' \phi(\vec{r}')\vec{v}.\vec{\sigma}(\vec{r}').\vec{\nabla}' G(\vec{r},\vec{r}';\vec{\sigma})$$

The equations verified by the electric potential (1) and the Green function (6), as well as the boundary conditions that they fulfill (respectively (2), (3), (4) and (7), (8), (9)), allow considerable simplification of equation (10). The δ-function directly extracts the electric potential. This is now denoted $\phi_T$ (T stands for transmitter):

$$\phi_T(\vec{r}) = \int_{\cup_k \Gamma_k} dS' G(\vec{r},\vec{r}';\vec{\sigma}) \frac{V_k}{Zc_k} \quad (11)$$

Equation (11) expresses the electric potential as a surface integral over the tool electrodes, which depends on the Green function, the voltage, and the contact impedance of the electrodes.

Consider the situation involving one transmitter electrode T and one sensor electrode R. Later, the actual case will be treated by the superposition principle. In this particular case involving one transmitter electrode and one sensor electrode, the electric potential generated by the transmitter is:

$$\phi_T(\vec{r}) = \int_{\Gamma_T} dS' G(\vec{r},\vec{r}';\vec{\sigma}) \frac{V_T}{Zc_T} + \int_{\Gamma_R} dS' G(\vec{r},\vec{r}';\vec{\sigma}) \frac{V_R}{Zc_R}$$

In practice, we observe a fast decay up to a null value of the electric potential around the transmitting electrode, so the voltage of the receptor can be considered as null, and the second integral can be neglected. Finally:

$$\phi_T(\vec{r}) = \int_{\Gamma_T} dS' G(\vec{r},\vec{r}';\vec{\sigma}) \frac{V_T}{Zc_T} \quad (12)$$

Ohm's law gives an expression of the current entering the sensor electrode:

$$I_R = -\int_{\Gamma_R} dS \vec{v} \cdot \vec{\sigma}(\vec{r}) \cdot \vec{\nabla} \phi_T(\vec{r}) \quad (13)$$

$$= -\frac{V_T}{Zc_T} \int_{\Gamma_R} dS \vec{v} \cdot \vec{\sigma}(\vec{r}) \cdot \vec{\nabla} \int_{\Gamma_T} dS' G(\vec{r},\vec{r}';\vec{\sigma})$$

The transfer admittance from T to R is defined as the ratio between the current entering R and the voltage of T. It is the inverse of the transfer impedance:

$$Y_{TR} = \frac{1}{Z_{TR}} = \frac{I_R}{V_T}$$

The transfer admittance can thus be expressed analytically:

$$Y_{TR} = -\frac{1}{Zc_T}\int_{\Gamma_R} dS\vec{v}\cdot\vec{\sigma}(\vec{r})\cdot\vec{\nabla}\int_{\Gamma_T} dS' G(\vec{r},\vec{r}';\vec{\sigma}) \quad (14)$$

Consider now a new behavior of the tool: the transmitter acts as a receptor and vice-verse. The sensor electrodes induce the following potential that is called "reciprocal":

$$\tilde{\phi}_R(\vec{r}) = \frac{1}{Zc_R}\int_{\Gamma_R} dS G(\vec{r},\vec{r}';\vec{\sigma}) \quad (15)$$

Note that up to the multiplicative coefficient $V_T$, this expression is similar to the one of the primal potential (12).

Writing the Green function as a volume integral and manipulating it by using its definition (6) leads to the following expression:

$$G(\vec{r},\vec{r}';\vec{\sigma}) = \int dV''(\vec{\nabla}'' G(\vec{r}'',\vec{r};\vec{\sigma}))\cdot\vec{\sigma}(\vec{r}'')\cdot((\vec{\nabla}'' G(\vec{r}'',\vec{r}';\vec{\sigma})) \quad (16)$$

The Green function between the two points $\vec{r}$ and $\vec{r}'$ is factored into two Green functions involving a third point.

Equations (14) and (16) may be combined together and manipulated:

$$Y_{TR} = -\frac{1}{Zc_T}\int_{\Gamma_R} dS\vec{v}\cdot\vec{\sigma}(\vec{r})\cdot\vec{\nabla}\int_{\Gamma_T} dS'\int dV''(\vec{\nabla}'' G(\vec{r}'',\vec{r};\vec{\sigma}))\cdot \quad (17)$$

$$\vec{\sigma}(\vec{r}'')\cdot(\vec{\nabla}'' G(\vec{r}'',\vec{r}';\vec{\sigma}))$$

$$= -\int dV''\left[\vec{\nabla}''\int_{\Gamma_R} dS\vec{v}\cdot\vec{\sigma}(\vec{r})\cdot\vec{\nabla} G(\vec{r}'',\vec{r};\vec{\sigma})\right]\cdot\vec{\sigma}(\vec{r}'')\cdot$$

$$\left[\vec{\nabla}''\frac{1}{Zc_T}\int_{\Gamma_T} dS' G(\vec{r}'',\vec{r}';\vec{\sigma})\right]$$

The Green function fulfills a Robin condition on the edge of the sensor electrode FR:

$$\vec{v} \cdot \vec{\sigma}(\vec{r}) \cdot \vec{\nabla} G(\vec{r}'', \vec{r}; \vec{\sigma}) = -\frac{1}{Z c_R} G(\vec{r}'', \vec{r}; \vec{\sigma}) \text{ on } \Gamma_R \qquad (9)$$

The transfer admittance can then be expressed as a function of the primal and the reciprocal potentials. Equations (12) and (15) infer:

$$Y_{TR} = -\int dV'' \left[ -\vec{\nabla}'' \frac{1}{Z c_R} \int_{\Gamma_R} dS G(\vec{r}'', \vec{r}; \vec{\sigma}) \right] \cdot \vec{\sigma}(\vec{r}'') \cdot \qquad (18)$$

$$\left[ \vec{\nabla}'' \frac{1}{Z c_T} \int_{\Gamma_T} dS' G(\vec{r}'', \vec{r}'; \vec{\sigma}) \right]$$

$$= \frac{1}{V_T} \int dV'' \left( \vec{\nabla}'' \tilde{\phi}_R(\vec{r}'') \right) \cdot \vec{\sigma}(\vec{r}'') \cdot ' \left( \vec{\nabla}'' \phi_T(\vec{r}'') \right)$$

$$= \frac{1}{V_T} \int dV'' \left( \vec{\tilde{E}}_R(\vec{r}'') \right) \cdot \vec{\sigma}(\vec{r}'') \cdot ' \left( \vec{E}_T(\vec{r}'') \right)$$

The transfer impedance thus reduces to a volume integral involving the anisotropy tensor and the primal and reciprocal electric fields.

Consider a small variation of a diagonal term of the conductivity tensor at some point $\vec{r}_0$:

$$\sigma_{ij}(\vec{r}) \rightarrow \sigma_{ij}(\vec{r}) + \Delta \sigma_{ij} \delta^2(\vec{r} - \vec{r}_0), \forall \vec{r}$$

The intent of this consideration is to determine how much such a change affects the transfer admittance $Y_{TR}$. Indeed:
- the formation parameters can all easily be expressed in terms of the spatial conductivity tensor; and
- the apparent resistivities can easily be expressed in terms of the transfer admittances So obtaining the different sensitivities becomes trivial.

The sensitivity of the Green function with respect to a local change in $\vec{r}_0$ of the conductivity tensor can be decoupled:

$$\frac{\delta G(\vec{r}, \vec{r}'; \vec{\sigma})}{\delta \sigma_{ij}(\vec{r}_0)} = (\partial_{0,i} G(\vec{r}, \vec{r}_0; \vec{\sigma}))(\partial_{0,j} G(\vec{r}_0, \vec{r}'; \vec{\sigma})) \qquad (19)$$

where $\partial_{0,i} G$ represents the derivative of G with respect to the i-th component of $\vec{r}_0$.

This factorized description is used in the manipulation that follows. The change in the transfer admittance due to $\delta \sigma_{ij}$ can first be expressed from (14). Then the first term of the right-hand side of (19) can be pushed out of the second integral, as it is independent of r'. The first term becomes:

$$\frac{\delta Y_{TR}}{\delta \sigma_{ij}(\vec{r}_0)} = -\frac{1}{Z c_T} \int_{\Gamma_R} dS \vec{v} \cdot \vec{\sigma}(\vec{r}) \cdot \vec{\nabla} \int_{\Gamma_T} dS' \frac{\delta G(\vec{r}, \vec{r}'; \vec{\sigma})}{\delta \sigma_{ij}} \qquad (20)$$

$$= -\left( \partial_{0,i} \int_{\Gamma_R} dS \vec{v} \cdot \vec{\sigma}(\vec{r}) \cdot \vec{\nabla} G(\vec{r}, \vec{r}_0; \vec{\sigma}) \right)$$

$$\left( \partial_{0,j} \frac{1}{Z c_T} \int_{\Gamma_T} dS' G(\vec{r}_0, \vec{r}'; \vec{\sigma}) \right)$$

In the second integral, we recognize the primal potential, up to the multiplicative factor $V_T$. For the first integral, the boundary condition fulfilled by the Green function on the electrodes first has to be used again:

$$\vec{v} \cdot \vec{\sigma}(\vec{r}) \cdot \vec{\nabla} G(\vec{r}, \vec{r}_0; \vec{\sigma}) = \frac{1}{Z c_R} G(\vec{r}, \vec{r}_0; \vec{\sigma}) \text{ on } \Gamma_R \qquad (9)$$

Then the reciprocal potential appears in the first integral. Finally:

$$\frac{\delta Y_{TR}}{\delta \sigma_{ij}(\vec{r}_0)} = \frac{1}{V_T} (\partial_{0,i} \tilde{\phi}_R(\vec{r}_0))(\partial_{0,j} \phi_T(\vec{r}_0)) \qquad (21)$$

$$= \frac{1}{V_T} \tilde{E}_{R,i}(\vec{r}_0) E_{T,j}(\vec{r}_0)$$

The change in the transfer admittance due to an infinitesimal modification of the value (i,j) of the conductivity tensor in $\vec{r}_0$ is only dependant of the i-th component of the reciprocal electric field and the j-th component of the primal electric field in $\vec{r}_0$, as well as the voltage of the transmitter. This is a very important feature, and this is the basis of the sensitivity computation according to some aspects of the present invention.

The use of the superposition principle enables obtaining the derivative of the "transfer admittance" for the mode f of certain resistivity measurement tools (f=1, ..., 5) with respect to any local change in conductivity (for certain tools, the transmitter is a central electrode $A_0$):

$$\frac{\delta Y^f}{\delta \sigma_{ij}(\vec{r}_0)} = \frac{1}{V_{A_0}^f} \tilde{E}_i(\vec{r}_0) E_j^f(\vec{r}_0) \qquad (22)$$

Then we need to define what the reciprocal electric field $\vec{\tilde{E}}$ is for the resistivity measurement tool.

Software focusing for certain resistivity tools may be achieved by firing the central electrode $A_0$ at a given intensity. Then, to obtaining the mode f $A_0$ is short-circuited with the surrounding electrodes $A_1, ... A_f$ and $A'_1, ... A'_f$. This ensures the desired equipotentiality along the section from $A'_f$ to $A_f$ (see, for example, mode 3 of a resistivity tool 200 illustrated in FIG. 2).

Figure 5:
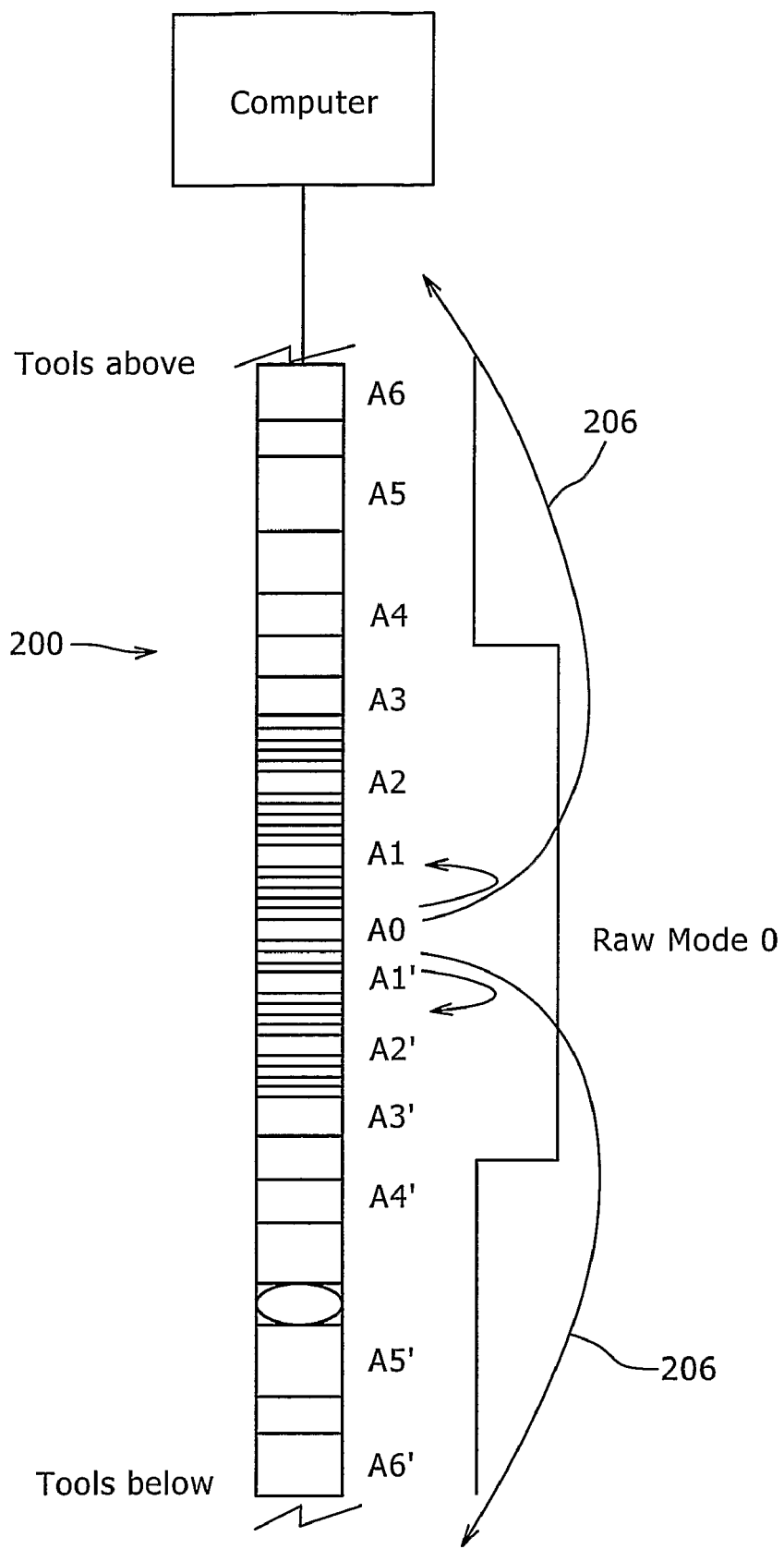
FIG. 5 is the subterranean resistivity measurement system of FIG. 3 operating in the virtual reciprocal mode according to one embodiment of the present invention.

The reciprocal mode is obtained by setting the central electrode $A_0$ as a source of tension instead as a source of current and by actually measuring the current flowing out of $A_0$. This configuration is exactly the one present when the mode 0 of the tool is activated (see FIG. 5): the current flows out of $A_0$ only and the voltage gap is located between $A_0$ and $A_1$ (resp. $A'_1$).

Tool mode 0 is very shallow and sensitive almost exclusively to the mud column. Thus, traditionally this mode is only used for an evaluation of the mud resistivity. However the voltage for this mode is computed in with a 2D simulator, and we can take advantage of this computation for computing the sensitivities:

$$\frac{\delta Y^f}{\delta \sigma_{ij}(\vec{r}_0)} = \frac{1}{V_{A_0}^f} E_i^0(\vec{r}_0) E_j^f(\vec{r}_0) \qquad (23)$$

As some simulation programs used in accordance with the present invention deal with symmetric conductivity tensors, we only need to consider:

$$\sum_{i=1}^{2} \frac{\delta Y^f}{\delta \sigma_{ii}(\vec{r}_0)} = \frac{1}{V_{A_0}^f} \sum_{i=1}^{2} E_i^0(\vec{r}_0) E_i^f(\vec{r}_0) = \frac{1}{V_{A_0}^f} \vec{E}^0 \cdot \vec{E}^f$$

The variation of the transfer impedance with respect to the conductivity at one point thus depends of the scalar product between the primal and reciprocal electric fields at this point.

Figure 6:
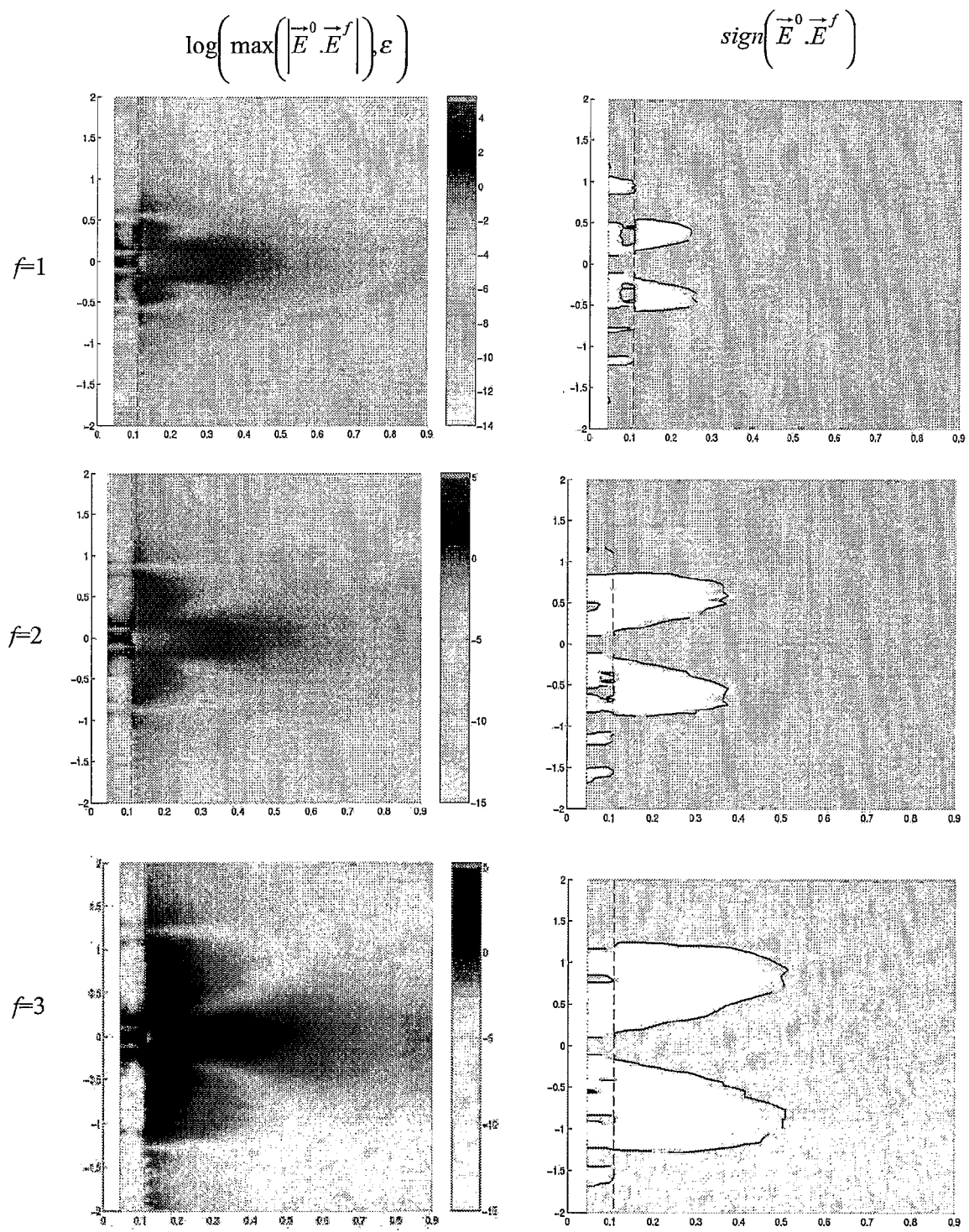
FIG. 6 is an illustration of a scalar product between primal and reciprocal fields for six modes of a subterranean resistivity measurement system according to one embodiment of the present invention.

FIG. 6 illustrates the sign and value of this scalar product near the tool 200 for focusing modes 1 to 5. The formation of FIG. 6 is the same as the one used to generate FIG. 1 (homogeneous, Rt=10 Ω.m, rh=4.25 in and Rm=0.1 Ω.m). The distances are indicated in meters, and the borehole wall is shown as a dashed line.

The sign of the scalar products (figures on the right in FIG. 6, positive sign shown in pink, negative sign in white) are as expected. Indeed the difference of focusing between mode 0 and mode f results in the corresponding potentials being high in different regions: around $A_0$ for mode 0, and around the zone going from $A'_f$ to $A_f$ for mode f. Hence the negative sign of the scalar product between the fields around $A_1$ to $A_f$ and $A'_1$ to $A'_f$. Moreover the increasing radial depth of the measurement makes the negative zone to increase radially with f.

The values (figures on the left of FIG. 6) also behave as expected. The value is the highest in the formation surrounding the borehole right in front of $A_0$ (purple zone). Indeed here, both for mode 0 and f, the potential decreases rapidly in the radial direction, hence a high value of the scalar product.

Thus with very little additional computing time (only the time for computing the electric fields for mode 0 to f and the appropriate scalar products which can be done simultaneously with the running of the 2D simulation), the sensitivity of the transfer admittance with respect to a change anywhere in the formation is obtained numerically on the fly without reference to a look-up chart or table.

The information needed at each iteration of an inversion loop is the tool response with respect to the inversion parameters. The apparent resistivities of the resistivity tool are linked to the transfer admittances through the relation (using the geometrical k-factor)

$$R_{app}^f = \frac{K^f}{Y^f};$$

Using equation (23), the tool sensitivity with respect to a change in a conductivity component anywhere in the formation then follows (as the intensity flowing out of the resistivity tool is 1 A, we implicitly simplify):

$$\frac{\delta RLA^f}{\delta \sigma_{ii}(\vec{r}_0)} = -\frac{K^f}{(Y^f)^2} \frac{\partial Y^f}{\delta \sigma_{ii}(\vec{r}_0)} = -K^f V_{A_0}^f E_i^0(\vec{r}_0) E_i^f(\vec{r}_0) \qquad (24)$$

Then as any inversion parameter p can be expressed as a function of the conductivity tensor at any point of the formation, the derivatives of the tool response with respect to the inversion parameters can easily be obtained by appropriate integration.

In addition to varying conductivity point by point, sensitivities may be computed parametrically. At each iteration of an inversion loop, we need to evaluate the sensitivities of the tool response with respect to the m parameters defining the formation: $p_1, \ldots, p_m$.

For each parameter $p_i$, the support $V_i$ of $$\frac{\delta \sigma_k}{\delta p_i}$$

is different (and usually small as each parameter defines a small zone in the formation). The desired sensitivities are then given by:

$$\frac{\delta R_{app}}{\delta p_i} = \sum_k \int\int\int_i \frac{\delta R_{app}}{\delta \sigma_k(\vec{r})} \frac{\delta \sigma_k(\vec{r})}{\delta p_i} dV_i \qquad (25)$$

In the finite differences/finite elements/finite volume method, the space is partitioned into several zones or elements where the characteristics of the medium are approximated by constant values. The support for each parameter $p_i$ is then a certain number of zones with volume $V_j$, and the above integral is changed into:

$$\frac{\delta R_{app}}{\delta p_i} = \sum_{j,k} \frac{\delta R_{app}}{\delta \sigma_{j,k}} \frac{\delta \sigma_{j,k}}{\delta p_i} V_j \qquad (26)$$

Further, by using the principle of reciprocity and denoting $\tilde{E}$ as the field generated by the reciprocal mode of the tool, the following equation is true (see discussion above):

$$\frac{\delta R_{app}}{\delta \sigma_{j,k}} = -K V_{A0} E_{j,k} \tilde{E}_{j,k} \qquad (27)$$

Only the derivatives of the conductivity in each zone with respect to the inversion parameters remain to be evaluated. This can be done analytically or by finite difference (as in the case of non-conformal mesh an analytical expression is not always trivial, a computation by finite difference may be more cost-effective). If a finite difference computation is chosen, then the formula that may be used to compute the sensitivities is (with δ=0.01):

$$\frac{\delta R_{app}}{p_i} = -\frac{K * V_{A0}}{\delta * p_i} \sum_{j,k} \left(E_{j,k} * \tilde{E}_{j,k} * (\sigma_{j,k}((1+\delta)p_i) - \sigma_{j,k}(p)) * V_j\right) \quad (24')$$

Hence the following workflow/algorithm/programming instructions (n is the number of zones defined by the numerical method):

For j=1 ... n, k=1, 2: compute & store $E_{j,k}$
For j=1 ... n, k=1, 2: compute & store $\tilde{E}_{j,k}$
Initialize all sensitivities to 0.
For j=1 ... n
Compute $\sigma_j(p)$
For i=1 ... m, if Support($p_i$)∩Zone$_j$ is not empty:

Compute $\sigma_j((1+\delta)p_i)$ $$\frac{\delta R_{app}}{\delta p_i} = \frac{\delta R_{app}}{\delta p_i} + \sum_{j,k} \left(E_{j,k} * \tilde{E}_{j,k} * (\sigma_{j,k}((1+\delta)p_i) - \sigma_{j,k}(p)) * V_j\right)$$

Finally, for $$i = 1...m, \frac{\delta R_{app}}{\delta p_i} = \frac{\delta R_{app}}{\delta p_i} * \left(-\frac{K * V_{A0}}{\delta * p_i}\right)$$

Figure 7:
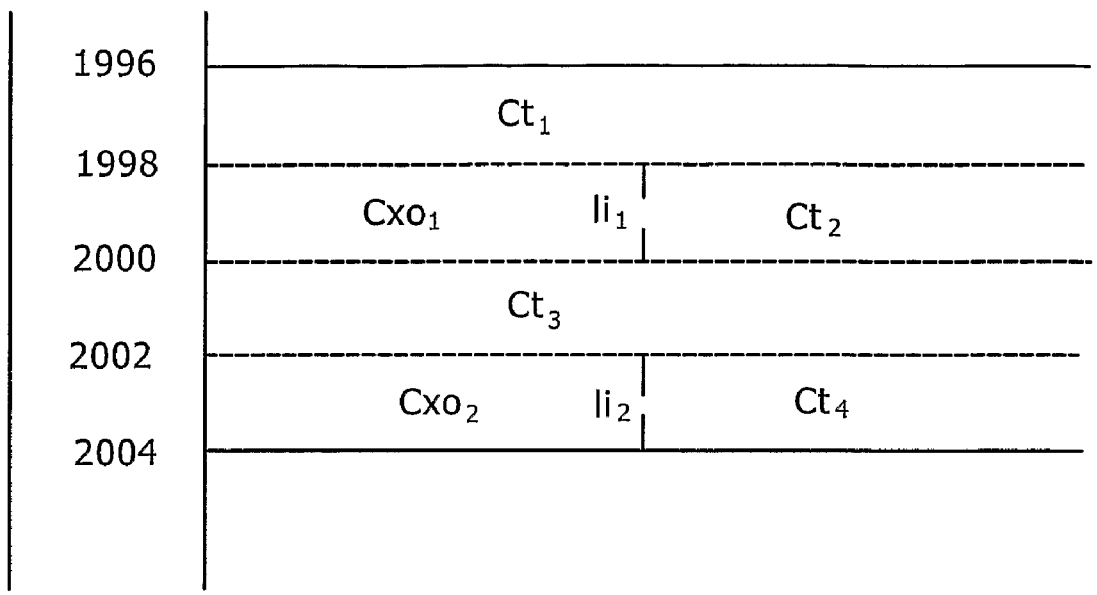
FIG. 7 illustrates a borehole case used to verify the methods of the present invention.
Figure 8:
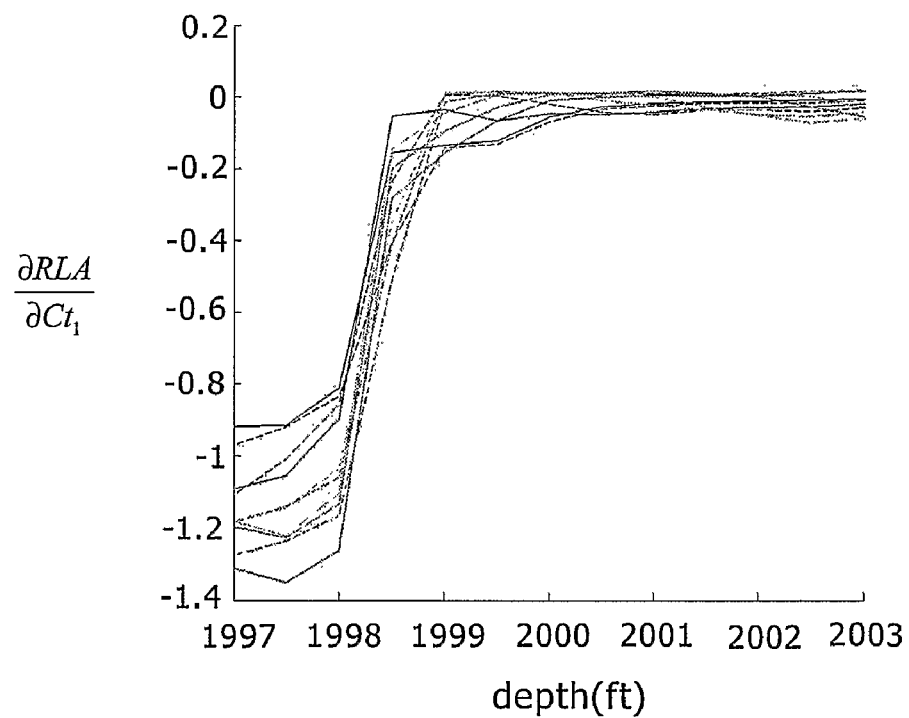
FIGS. 8-8F illustrate the results of applying conventional methods and methods of the present invention to the case described in FIG. 7.
Figure 8B:
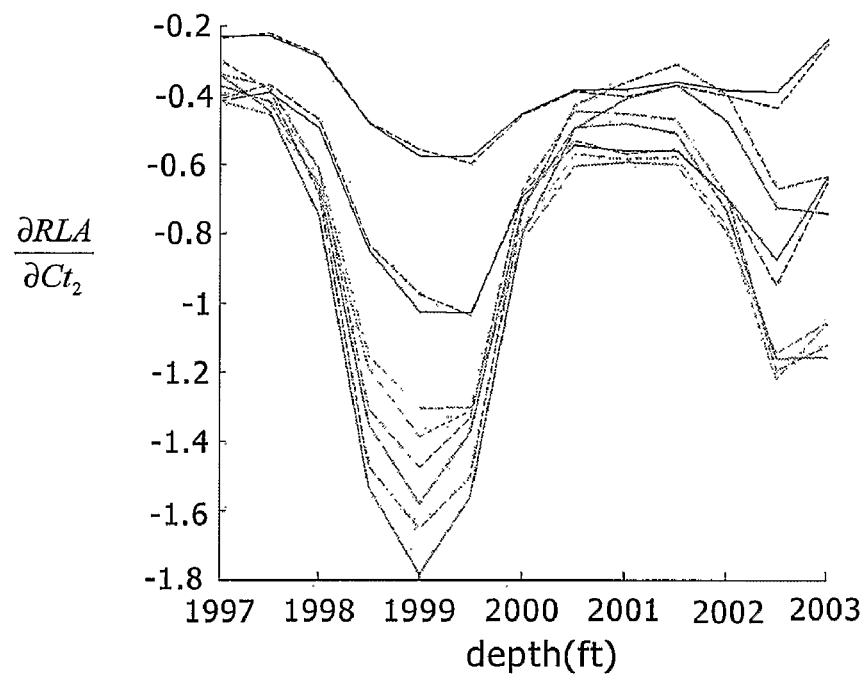
Figure 8C:
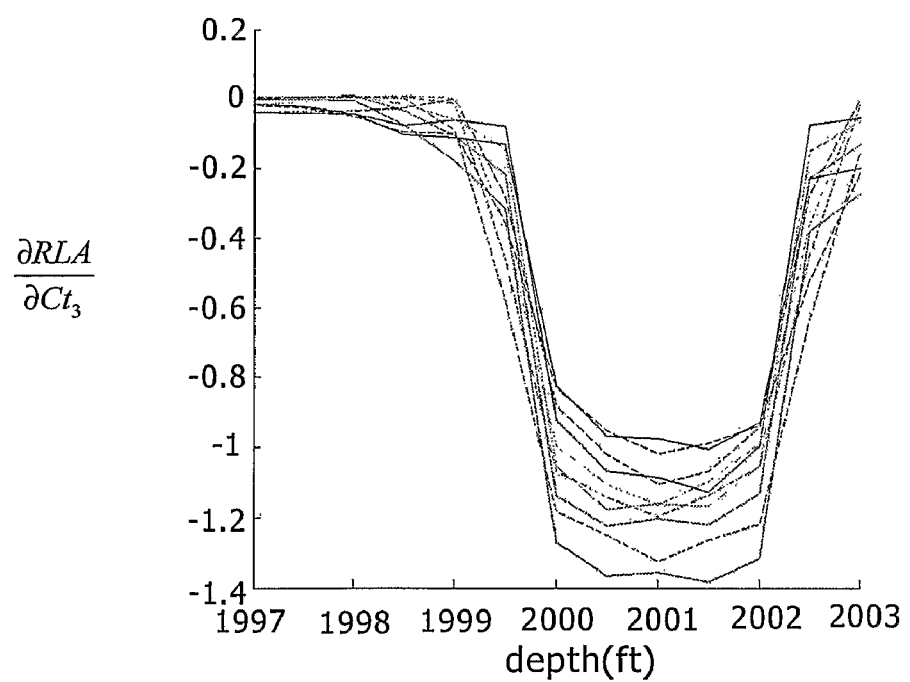
Figure 8D:
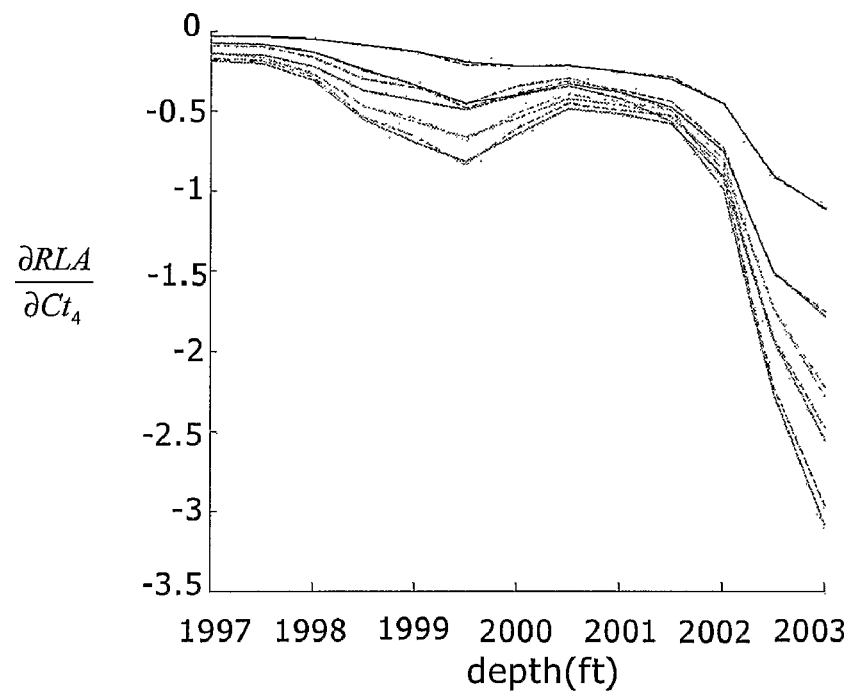
Figure 8E:
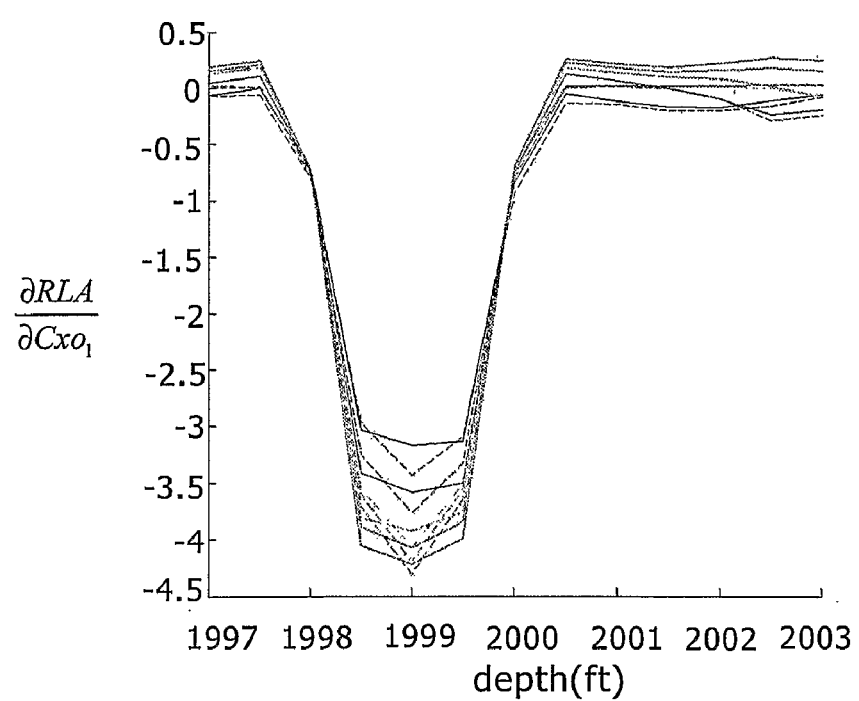
Figure 8F:
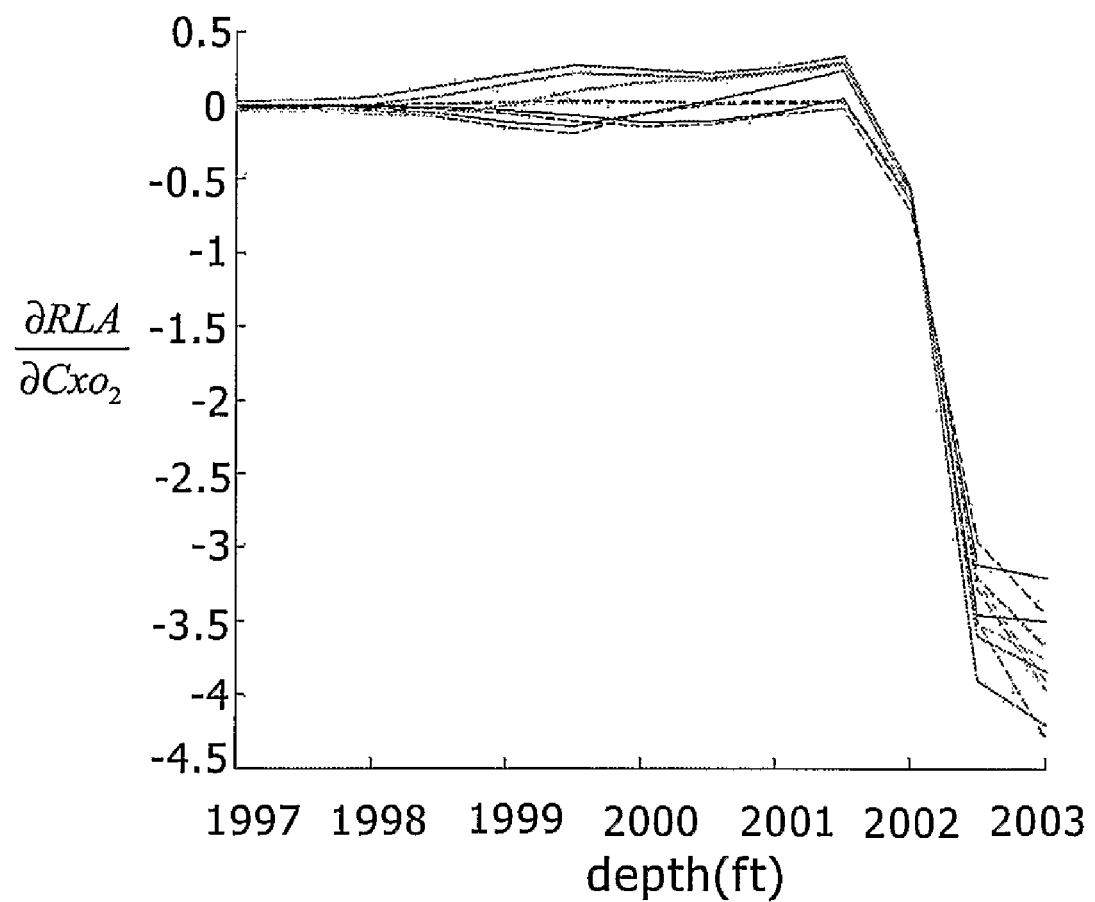

Actual results of implementing the methods described above to compute sensitivities as compared to traditional methods are shown in a case that follows. The results of traditional computation are illustrated by solid lines, while the computations made according to principles of the present invention are shown with dashed lines. FIG. 7 illustrates the case described. The parameters inverted for were $Ct_1$, $Ct_2$, $Ct_3$, $Ct_4$, $Cxo_1$, $Cxo_2$. As shown in FIGS. 8A-8F, respectively. The derivative of each curve of the apparent resistivity is represented by a different color. The results of the traditional and new methods are nearly identical. However, for the methods of the present invention, the computation time was approximately 10% of the traditional time needed. Therefore, significant time savings may be achieved by application of the principles described herein. The values of the parameters were as follows:

$Ct_1$=1 S.m, $Ct_2$-0.1 S.m, $Ct_3$=1 S.m, $Ct_4$=0.1 S.m
$Cxo_1$=0.5 S.m, $Cxo_2$=0.5 S.m
$li_1$=15.74 in, $li_2$=15.74 in.

The preferred embodiments were chosen and described in order to best explain the principles of the invention and its practical application. The preceding description is intended to enable others skilled in the art to best utilize the invention in various embodiments and with various modifications as are suited to the particular use contemplated. The description may be implemented in any resistivity measurement tool, particularly galvanic tools. In addition, the methods may be programmed as a set of instructions, that, when executed, perform the methods described herein. Likewise, systems such as the logging tool system 200 may be used to implement principles of the present invention. It is intended that the scope of the invention be defined by the following claims.

What is claimed is:

1. A method for evaluating a subterranean formation resistivity measurement apparatus, comprising:
   receiving resistivity measurements obtained by laterologs;
   computing sensitivities of the subterranean formation resistivity measurement apparatus using numerical analysis, wherein computing sensitivities comprises computing electrical potential differences expressed with a Green function, at each iteration of an inversion loop with respect to a plurality of parameters; and
   iteratively running an inversion simulation for formation resistivity simultaneous with the computing sensitivities.

2. A method according to claim 1, wherein the numerical analysis used to compute the sensitivities of the resistivity measurement apparatus comprises finite element analysis.

3. A method according to claim 1, wherein the discreet numerical analysis used to compute the sensitivities of the resistivity measurement comprises finite difference analysis.

4. A method according to claim 1, wherein the discreet numerical analysis used to compute the sensitivities of the resistivity measurement apparatus comprises finite volume analysis.

5. A method according to claim 1, wherein the subterranean formation resistivity measurement apparatus comprises a galvanic-type tool.

6. A method according to claim 1, wherein the computing sensitivities of the subterranean formation resistivity measurement apparatus using numerical analysis comprises computing sensitivities to inversion parameters of a laterolog.

7. A computer readable storage device encoding a program of instructions including instructions for:
   receiving resistivity measurements obtained by laterologs;
   computing tool response sensitivities of a subterranean formation resistivity measurement tool using discreet numerical analysis, wherein computing sensitivities comprises computing electrical potential differences expressed with a Green function, at each iteration of an inversion loop with respect to a plurality of parameters; and
   iteratively running an inversion simulation for formation resistivity simultaneous with the computing sensitivities.

8. A computer readable storage device encoding a program of instructions according to claim 7, wherein the discreet numerical analysis includes one of: finite volume analysis, finite element analysis, and finite difference analysis.

* * * * *